Aug. 9, 1955
A. A. MEYER
2,714,746
METHOD OF JOINING PLASTIC AND METAL
Filed Oct. 1, 1952
3 Sheets-Sheet 1
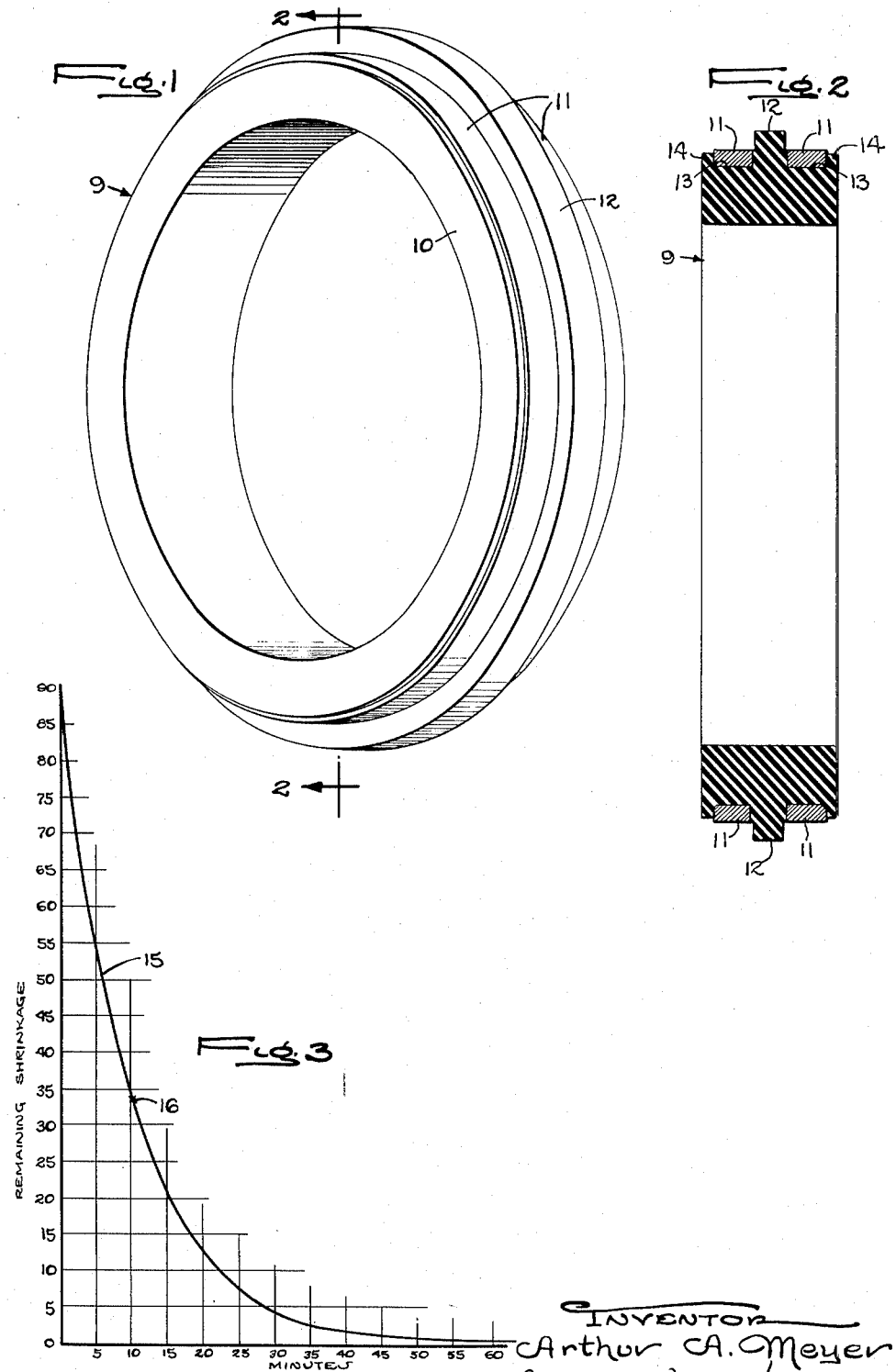
INVENTOR
Arthur A. Meyer
By Carlsen, Pitzner, Hubbard & Wolfe
ATTORNEYS

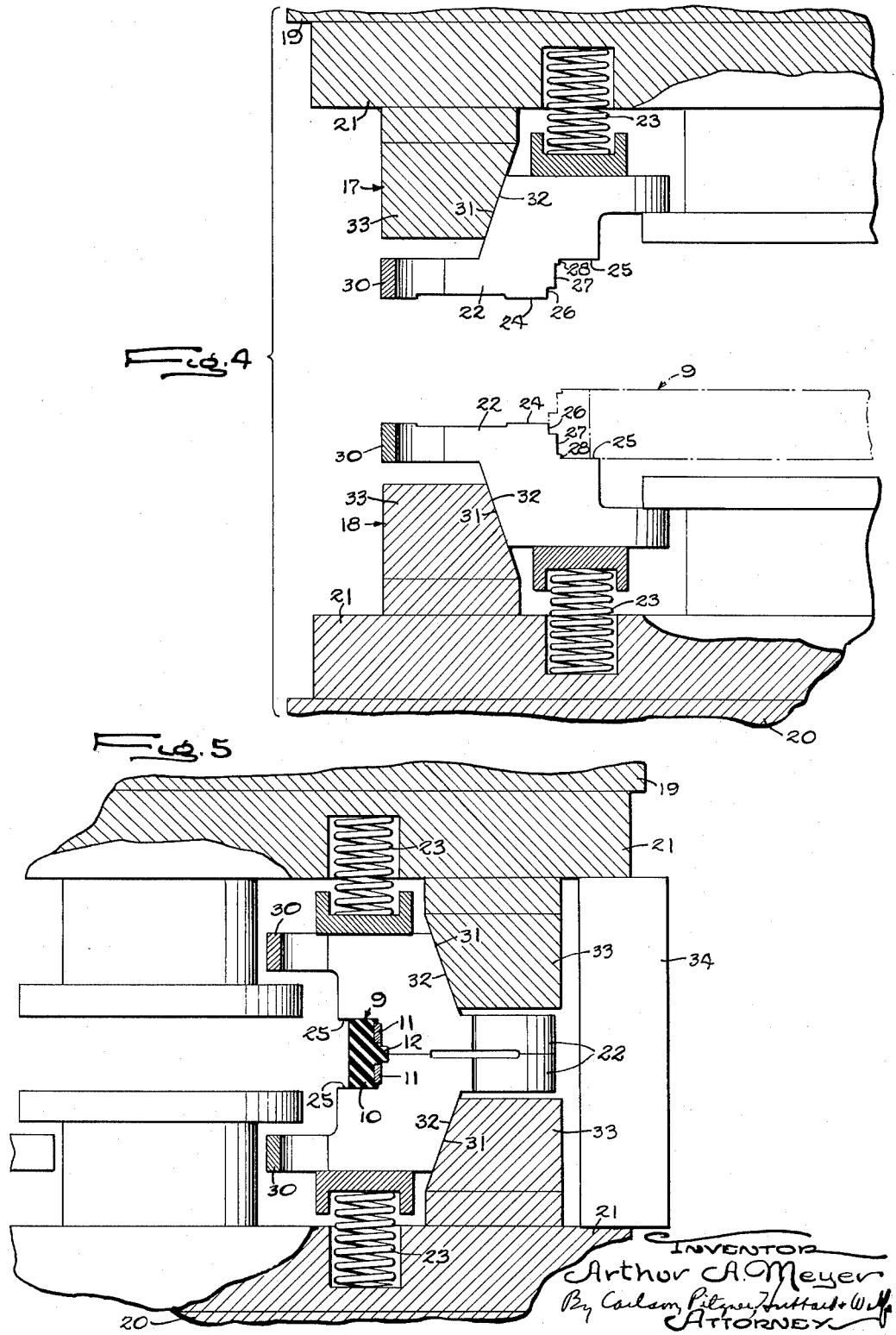

Aug. 9, 1955  A. A. MEYER  2,714,746
METHOD OF JOINING PLASTIC AND METAL
Filed Oct. 1, 1952  3 Sheets-Sheet 3
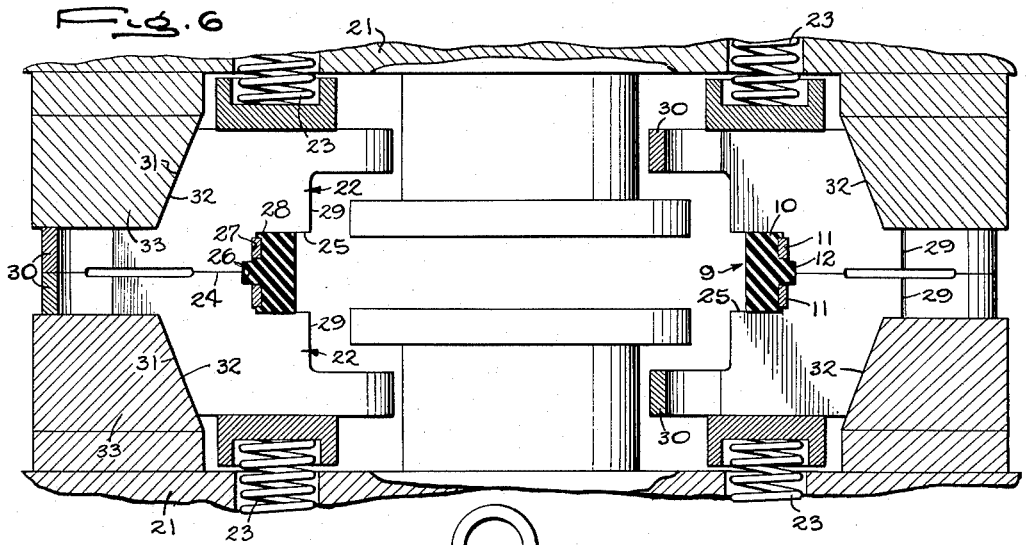
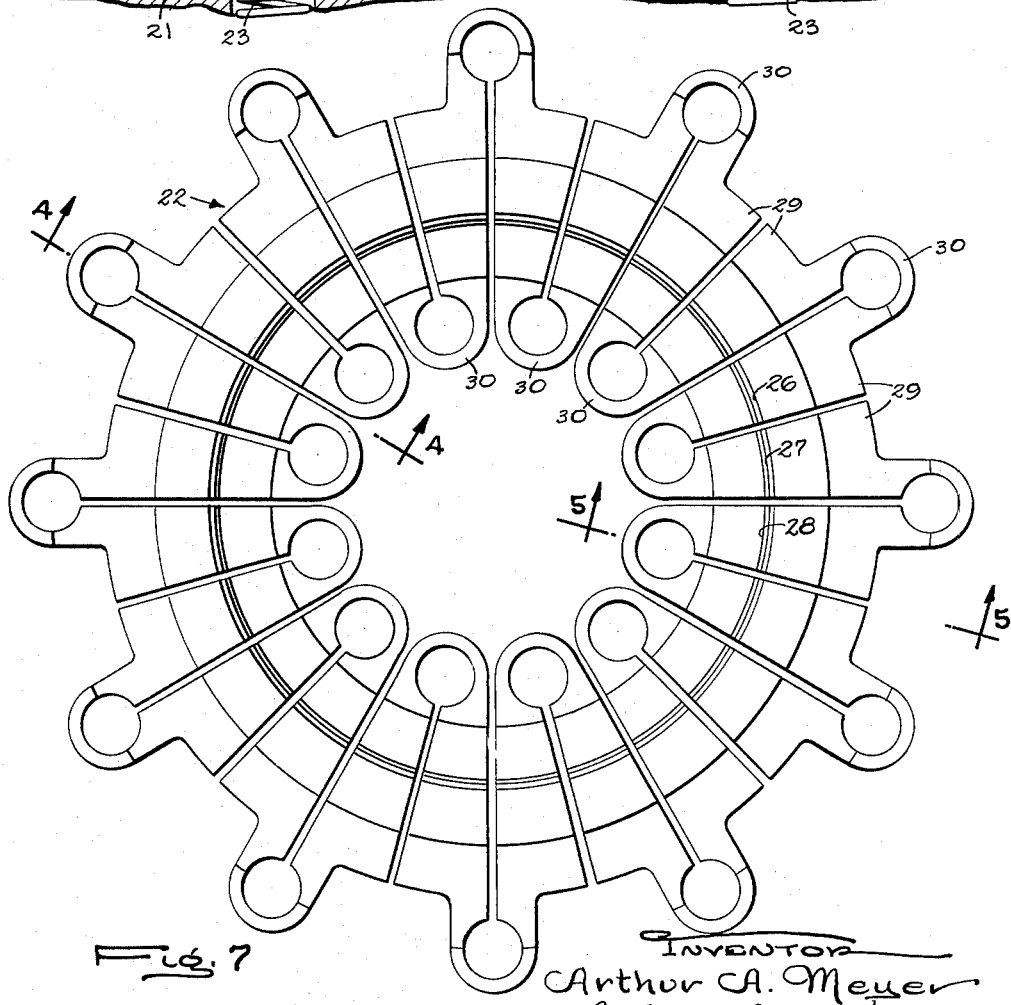
INVENTOR
Arthur A. Meyer
By Carlsen Pitzner Hubbard Wolfe
ATTORNEY

United States Patent Office 2,714,746
Patented Aug. 9, 1955

2,714,746

METHOD OF JOINING PLASTIC AND METAL

Arthur A. Meyer, Beloit, Wis., assignor to Warner Electric Brake & Clutch Company, South Beloit, Ill., a corporation of Illinois Application October 1, 1952, Serial No. 312,445

7 Claims. (Cl. 18—475)

This invention relates to a method of joining a part made of metal to a part made of plastic and, particularly, to a method of joining rings made of these materials. Attempts have been made to join two such parts together by molding one part around the other, but heretofore such attempts have been unsuccessful because the plastic shrinks more upon cooling than does the metal so that, due to the differential shrinkage between the two materials, the parts break and become distorted.

The general object is to provide a novel method by which plastic and metal parts may be joined together by molding without the danger of the parts being broken as an incident to cooling from the molding temperature.

A more detailed object is to compensate for the differential shinking of the parts by deforming the parts relative to each other after they have been molded together and begun to cool but before the plastic has cracked.

Another object is to deform the parts after initial cooling but before cracking of the plastic to compensate for the differential shrinking occurring during the period of initial cooling and then, before final setting of the materials, to deform the parts a second time to compensate for the shrinkage taking place in the remainder of the cooling period.

Other objects and advantages of the invention will become apparent from the following detailed description taken in connection with the accompanying drawings, in which Figure 1 is a perspective view of a collector ring assembly made by the novel method of the present invention.

Figure 2 is a sectional view taken along the line 2—2 in Fig. 1.

Fig. 3 is a graph showing the shrinkage of the plastic.

Figs. 4 and 5 are fragmentary sectional views taken respectively along the lines 4—4 and 5—5 in Fig. 7.

Fig. 6 is a sectional view similar to Figs. 4 and 5 and showing the parts in a different position.

Fig. 7 is a plan view of a die which may be used in carrying out the method.

While the invention may be employed to join together two parts of various shapes, it is illustrated in the drawings and described herein in detail as practiced in joining an electrically conducting collector ring and an insulating ring supporting the collector ring. It is to be understood, however, that I do not intend to limit the invention by such disclosure but aim to cover the alternative methods falling within the spirit and scope of the invention as expressed in the appended claims.

The collector ring assembly 9 shown in the drawings to illustrate the invention comprises an insulating ring 10 supporting on its outer periphery two collector rings 11 of an electrically conducting material such as brass, the collector rings being separated from each other by a radial flange 12 on the insulating ring. In the present instance, the insulating ring 10 is made of a moldable plastic such as Bakelite, which is relatively brittle after it has set, and is formed with two peripheral grooves 13 which are defined by the flange 12 and two shorter flanges 14 at the ends of the ring. The collector rings 11 are seated in the grooves 13 and fit snugly so that they are rigid with the insulating ring 10 and turn with the latter when the composite annulus or assembly 9 is mounted on a rotating member such as one element of an electromagnetic clutch.

It has been proposed to form the composite annulus 9 by molding the plastic insulating ring 10 around the brass collector rings 11. This method was unsuccessful, however, because the insulating ring shrank more than the collector rings since the plastic in setting undergoes a molecular change which causes a substantial amount of shrinking. Due to the differential shrinkage, the grooves 13 became narrower than the collector rings with the result that the plastic cracked, particularly around the flanges 14. In addition, the insulating ring pulled away from the collector rings leaving the latter loosely seated in their grooves. Because of the failure of the molding method, it has been necessary to resort to the costly process of making the insulating ring in several parts which then, with the collector rings, are assembled to form the composite annulus.

I have found that plastic and metal parts may be molded together by employing an additional operation while the parts are cooling. This is based on the discovery that the plastic, after it has been molded but before it sets, may be deformed mechanically as by swaging even though it is relatively brittle after it has set. Accordingly, the present invention contemplates molding plastic and metal parts together and compensating for the differential shrinkage which occurs during cooling by mechanically deforming or swaging the parts relative to each other. Generally stated, therefore, the novel method includes the steps of molding one of the parts around the other part under heat and pressure and then, after initial cooling but before failure of the parts, swaging the latter relative to each other to correlate the sizes of the two parts. Preferably, the parts are deformed a second time in a similar manner just prior to the final setting of the plastic to compensate for the shrinkage which takes place during the remainder of the cooling period.

When the foregoing method is applied to the manufacture of the collector ring assembly 9, the plastic insulating ring 10 is molded around the brass collector rings 11. As pointed out above, the plastic shrinks more upon cooling than does the brass with the result that the flanges 12 and 14 are under strain and the insulating ring tends to pull away from the collector rings. Before the shrinkage of the plastic is enough to crack and break the insulating ring, the annulus 9 is compressed radially around its entire periphery. Such compression causes the metal and the plastic to flow so that the sizes of the grooves 13 and the rings 11 again are correlated. At the same time, the diameter of each collector ring is reduced an amount corresponding to the shrinkage of the insulating ring, that is, the natural shrinkage of the collector rings plus the mechanical shrinkage is approximately equal to the natural shrinkage of the plastic. The composite annulus then is allowed to cool until, just before the plastic has set, it is compressed again to compensate for the difference in the shrinkage which has taken place during the remainder of the cooling period.

In the present instance, the plastic used for the insulating ring 10 cools and sets in about one hour. The major portion of the shrinkage occurs during the first few minutes of cooling as shown by the line 15 in Fig. 3. It has been found that the plastic ring begins to crack after the annulus 9 has cooled for 15 minutes at which time about 80 per cent of the shrinkage of the plastic has taken place. The collector rings, therefore, are compressed the first time after about 10 minutes when two-thirds of the plastic shrinkage has occurred as indicated by the point 16 in the graph. After the annulus 9 has cooled for 55 to 65 minutes, it is compressed again.

Since two-thirds of the radial shrinkage of the plastic takes place before the first compression, the diameter of the collector rings 11 is reduced by a corresponding proportion of the total mechanical shrinkage effected by the two compressing operations. If, for example, the final diameter of the collector rings is 3/16 of an inch less than the original diameter, the diameter is reduced 1/8 of an inch by the first compression and the final 1/16 of an inch by the second compression.

Both the plastic and the brass are somewhat resilient and tend, to a certain degree, to return to their natural size and shape after being swaged. The plastic, however, is more resilient than the brass. Preferably, advantage is taken of this difference in resiliency to insure a tight fit of the collector rings 11 on the insulating ring 10. To this end, the second swaging operation reduces the diameter of the plastic ring as well as that of the brass rings. Thus, when the pressure is released, the extra resiliency of the plastic results in the insulating ring pressing outwardly against the collector rings so that the three rings are held together securely.

An apparatus suitable for compressing or swaging the annulus 9 is shown in Figs. 4, 5, 6, and 7 and comprises two similar parts 17 and 18 secured respectively to the movable and stationary platens 19 and 20 of a press. Each part includes a flat base plate 21 rigidly fastened to the corresponding platen and yieldably supporting a die 22 through the medium of a plurality of compression springs 23 angularly spaced around the base. The face 24 of each die is recessed as indicated at 25 to receive the composite annulus 9. Thus an annular shoulder 26 adjacent the die face engages the periphery of the flange 12 on the insulating ring 10, a second shoulder 27 contacts the periphery of one collector ring 11 and a third shoulder 28 engages the flange 14. In the present instance, the recesses 25 extend over the ends of the annulus as shown so that the latter is compressed axially as well as radially.

In order that the shoulders 26, 27 and 28 may compress the annulus 9, the dies 22 are contractible. For this purpose, each die is made up of a plurality of segments 29 as shown in Fig. 7. Adjacent segments are spaced apart slightly and are connected by resilient generally U-shaped links 30 formed integrally with the segments 29, the links alternately connecting the segments at the inner and outer peripheries of the die. With this construction, the segments may be moved toward each other against the spring action of the links 30 to decrease the diameters of the die shoulders and compress the annulus 9.

To contract the dies 22, conical cam surfaces 31 on the backs of the dies engage mating surfaces 32 on cams 33 which project axially toward each other from the base plates 21. When the upper platen 19 is raised and the dies are separated as shown in Fig. 4, the springs 23 urge the dies toward the outer ends of the cams 33 so that the dies are expanded. When the platen 19 is lowered, first the faces 24 of the dies engage each other and then, upon the continued movement of the platen, the cams 33 are moved inwardly along the corresponding cam surfaces 31 on the dies to urge the die segments 29 together and contract the dies.

In using the apparatus for carrying out the method of the present invention, the composite annulus 9, after the initial cooling period has elapsed, is placed in the lower die 22 as shown in Fig. 4 and a gage block 34 (Fig. 5) is set on the outer edge of the lower base plate 21. The movable platen 19 then is lowered until the upper base plate engages the upper end of the gage block 34. The height of the gage block is such that the upper platen is stopped short of its lowermost position as shown in Fig. 5. In this intermediate position of the platen, the cams 33 only partially contract the dies 22 effecting the partial swaging of the annulus 9 after the initial cooling.

After the first swaging operation, the annulus 9 is cooled until just prior to the time when the plastic sets. The annulus then is compressed a second time by the dies 22 but this time the gage block 34 is removed so that the platen 19 is moved to its lowermost position as shown in Fig. 6. Thus, the dies are fully contracted and the insulating and collector rings are compressed and swaged to their final diameter.

It will be observed that the collector ring assembly 9, when made by the foregoing method, is easy and inexpensive to make. In addition to molding the annulus, only two simple swaging operations are required. When completed, the annulus is a rigid assembly with the collector rings 11 held securely on the insulating ring 10 in the grooves 13.

I claim as my invention:

1. The method of joining rings of plastic and metal materials comprising, molding one of said rings around the other under heat and pressure, after partial cooling of the rings but before failure of the plastic ring applying radial pressure to both rings at a plurality of points distributed around the circumferences of the rings to deform the same relative to each other thereby to compensate for the difference in shrinking of the two materials, and, after substantially all of the shrinkage of the rings has occurred but before final setting of the plastic, again applying pressure radially to both rings to effect a close fit between the rings.

2. The method of joining rings of metal and plastic materials comprising, molding said plastic ring around the metal ring under heat and pressure, cooling the composite annulus, compressing said annulus radially around the entire circumference thereof after partial cooling of the annulus and before failure thereof, and, after substantially full shrinkage of the rings but before final setting of the plastic, similarly compressing the annulus again.

3. The method of joining a plastic ring to a metal ring comprising, molding said rings together one within the other at an elevated temperature, mechanically deforming the rings relative to each other after partial cooling of the composite annulus but before failure of the same to bring the rings again into closely fitting relation, and, before final setting of the plastic, again deforming the rings relative to each other to bring the rings into closely fitting relation when finally cooled.

4. The method of joining parts of metal and plastic materials comprising molding said plastic part around the metal part under heat and pressure, mechanically deforming at least one of the parts after initial cooling of the parts but before failure thereof to compensate for the differential shrinking occurring during the period of initial cooling, and, prior to final setting of the materials, again deforming the parts relative to each other to compensate for shrinkage occurring during the remainder of the cooling period.

5. In a method of joining a metal ring to a ring of plastic material which is relatively brittle when set, the steps of, molding said plastic ring under heat and pressure and with a peripheral groove receiving said metal ring, and, after partial cooling of the ring but before failure of the same, mechanically applying both axial and radial pressure to said rings at a plurality of points distributed around the circumference thereof to change the radial sizes of both said rings and the axial size of at least said plastic ring thereby to compensate for the differential shrinkage of the rings and fit the metal ring closely both axially and radially within said groove.

6. In a method of joining a metal ring to a ring made of a plastic material which is comparatively brittle when set, the steps of molding said plastic ring around said metal ring under heat and pressure, and, after initial cooling but before failure of the rings, applying radial pressure to said rings at a plurality of points distributed around the circumference thereof to change the sizes of both of said rings differentially thereby to compensate for the differential shrinkage occurring during the period of initial cooling and bring the rings into closely fitting relation.

7. In a method of joining a metal part to a part made of a plastic material which is relatively brittle when set, the steps of, molding the plastic part around said metal part under heat and pressure, and, after partial cooling of the parts but before failure of the plastic part, compressing said parts to change the sizes of both of the parts thereby to compensate for differential shrinkage occurring during cooling and bring the parts into closely fitting relation.

References Cited in the file of this patent

UNITED STATES PATENTS

| | | |
|---|---|---|
| 2,327,113 | Krotz | Aug. 17, 1943 |
| 2,431,238 | Friedman | Nov. 18, 1947 |

FOREIGN PATENTS

| | | |
|---|---|---|
| 426,788 | Great Britain | Sept. 26, 1934 |